United States Patent
Petter et al.

(10) Patent No.: US 9,812,909 B2
(45) Date of Patent: Nov. 7, 2017

(54) SECTIONALIZED ELECTROMECHANICAL MACHINES HAVING LOW TORQUE RIPPLE AND LOW COGGING TORQUE CHARACTERISTICS

(71) Applicant: WEG Electric Corp., Duluth, GA (US)

(72) Inventors: Jeffrey K. Petter, Williston, VT (US); Hector Hurtado, Montpelier, VT (US)

(73) Assignee: WEG Electric Corp, Duluth, GA (US)

( * ) Notice: Subject to any disclaimer, the term of this patent is extended or adjusted under 35 U.S.C. 154(b) by 355 days.

(21) Appl. No.: 14/566,193

(22) Filed: Dec. 10, 2014

(65) Prior Publication Data

US 2015/0137652 A1    May 21, 2015

Related U.S. Application Data (62) Division of application No. 13/240,731, filed on Sep. 22, 2011, now Pat. No. 8,912,704.
(Continued)

(51) Int. Cl.
   *H02K 1/16*    (2006.01)
   *H02K 21/16*   (2006.01)
   (Continued)

(52) U.S. Cl.
   CPC .......... *H02K 1/165* (2013.01); *H02K 15/026* (2013.01); *H02K 21/16* (2013.01); *H02K 29/03* (2013.01);
   (Continued)

(58) Field of Classification Search
   CPC ............... H02K 1/00–1/34; H02K 3/00–3/528
   (Continued)

(56) References Cited

U.S. PATENT DOCUMENTS

| 2,078,668 A | 4/1937 | Kilgore |
| 3,708,707 A | 1/1973 | Kranz |
(Continued)

FOREIGN PATENT DOCUMENTS

| CH | 75705 | 9/1917 |
| CN | 1881758 | 6/2010 |
(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*
(Continued)

*Primary Examiner* — Thomas Truong
(74) *Attorney, Agent, or Firm* — Downs Rachlin Martin PLLC (57) ABSTRACT

A method and apparatus for reducing or eliminating the effects of torque ripple and cogging torque and otherwise improving performance in an electromechanical machine such as a motor or generator. The rotor and/or stator is conceptually sectionalized and the sections spaced apart by amount sufficient to alleviate deleterious aspects of cogging torque and torque ripple. Positioning of the stator teeth or rotor magnets is determined based on the calculated spacing. Conceptual sections may be formed as physically individual segments. Unwound teeth may be disposed in end spaces between sections occupying less than the entire area of the end space.

25 Claims, 7 Drawing Sheets

Related U.S. Application Data (60) Provisional application No. 61/385,660, filed on Sep. 23, 2010.

(51) Int. Cl.
  *H02K 29/03* (2006.01)
  *H02K 15/02* (2006.01)
  *H02K 1/14* (2006.01)
  *H02K 1/27* (2006.01)

(52) U.S. Cl.
  CPC ............. *H02K 1/148* (2013.01); *H02K 1/278* (2013.01); *H02K 2213/03* (2013.01); *H02K 2213/12* (2013.01); *Y02E 10/725* (2013.01); *Y10T 29/49009* (2015.01); *Y10T 29/49012* (2015.01)

(58) Field of Classification Search
  USPC .......... 310/216.001–216.137, 179, 180, 194, 310/195, 208
  See application file for complete search history.

(56) References Cited

U.S. PATENT DOCUMENTS

| | | | |
|---|---|---|---|
| 4,315,171 A | 2/1982 | Schaeffer | |
| 4,424,463 A | 1/1984 | Musil | |
| 4,769,567 A | 9/1988 | Kurauchi et al. | |
| 4,990,809 A * | 2/1991 | Artus | H02K 37/04 310/192 |
| 5,196,751 A | 3/1993 | Spirk | |
| 5,675,196 A | 10/1997 | Huang et al. | |
| 5,691,589 A | 11/1997 | Keim et al. | |
| 5,844,341 A | 12/1998 | Spooner et al. | |
| 6,265,804 B1 * | 7/2001 | Nitta | H02K 1/148 310/193 |
| 6,321,439 B1 | 11/2001 | Berrong et al. | |
| 6,717,323 B1 | 4/2004 | Soghomonian et al. | |
| 6,777,850 B2 | 8/2004 | Harada et al. | |
| 6,781,276 B1 | 8/2004 | Stiesdal et al. | |
| 6,819,016 B2 | 11/2004 | Houle et al. | |
| 6,844,656 B1 | 1/2005 | Larsen et al. | |
| 6,891,298 B2 | 5/2005 | Gary | |
| 7,113,899 B2 | 9/2006 | Shah et al. | |
| 7,183,689 B2 | 2/2007 | Schmidt et al. | |
| 7,740,107 B2 | 6/2010 | Lemburg et al. | |
| 7,808,136 B2 | 10/2010 | Knauff | |
| 8,061,999 B2 | 11/2011 | Bagepalli et al. | |
| 8,083,212 B2 | 12/2011 | Numajiri et al. | |
| 8,664,819 B2 | 3/2014 | Piercey et al. | |
| 8,789,274 B2 | 7/2014 | Bywaters et al. | |
| 8,816,546 B2 | 8/2014 | Bywaters et al. | |
| 8,912,704 B2 | 12/2014 | Petter et al. | |
| 2002/0074887 A1 | 6/2002 | Takano et al. | |
| 2002/0163272 A1 | 11/2002 | Larsson et al. | |
| 2006/0131985 A1 | 6/2006 | Qu et al. | |
| 2007/0257566 A1 * | 11/2007 | Vollmer | H02K 3/28 310/180 |
| 2008/0115347 A1 | 5/2008 | Majernik et al. | |
| 2008/0197742 A1 * | 8/2008 | Vollmer | H02K 3/28 310/198 |
| 2008/0309189 A1 | 12/2008 | Pabst et al. | |
| 2009/0026858 A1 | 1/2009 | Knauff | |
| 2009/0091210 A1 | 4/2009 | Bade et al. | |
| 2009/0129931 A1 | 5/2009 | Stiesdal | |
| 2009/0172934 A1 | 7/2009 | Mall et al. | |
| 2009/0261668 A1 | 10/2009 | Mantere | |
| 2012/0073118 A1 | 3/2012 | Bywaters et al. | |
| 2012/0074797 A1 | 3/2012 | Petter et al. | |

FOREIGN PATENT DOCUMENTS

| | | |
|---|---|---|
| DE | 3546226 A1 | 7/1986 |
| DE | 19905748 A1 | 8/1999 |
| DE | 19920309 A1 | 11/1999 |
| DE | 10027246 C1 | 10/2001 |
| DE | 102008063783 A1 | 6/2010 |
| EP | 938181 A1 | 8/1999 |
| EP | 1422806 A2 | 5/2004 |
| EP | 1458080 A1 | 9/2004 |
| EP | 1519040 A1 | 3/2005 |
| EP | 1988282 A2 | 11/2008 |
| EP | 2072814 A2 | 6/2009 |
| EP | 2131475 A2 | 12/2009 |
| EP | 2163528 A1 | 3/2010 |
| EP | 2182570 A1 | 5/2010 |
| EP | 2187506 A1 | 5/2010 |
| EP | 2226502 A1 | 9/2010 |
| EP | 2320080 A1 | 5/2011 |
| ES | 2233146 A1 | 6/2005 |
| JP | 53051407 A | 5/1978 |
| JP | 1231645 A | 9/1989 |
| JP | 4289759 A | 10/1992 |
| JP | 11335074 A | 12/1999 |
| JP | 2004289919 A | 10/2004 |
| JP | 2005210790 A | 8/2005 |
| JP | 2009131030 A | 6/2009 |
| WO | 0060719 A1 | 10/2000 |
| WO | 0121956 A1 | 3/2001 |
| WO | 2004017497 A1 | 2/2004 |
| WO | 2005031159 A1 | 4/2005 |
| WO | 2006032969 A2 | 3/2006 |
| WO | 2006045772 A1 | 5/2006 |
| WO | 2008014584 A1 | 2/2008 |
| WO | 2008021401 A2 | 2/2008 |
| WO | 2008069818 A1 | 6/2008 |
| WO | 2009112887 A1 | 9/2009 |
| WO | 2010024510 A1 | 3/2010 |
| WO | 2010037392 A2 | 4/2010 |
| WO | 2011031165 A1 | 3/2011 |
| WO | 2011052883 | 2/2012 |

OTHER PUBLICATIONS

Final Office Action dated Aug. 13, 2015, in related U.S. Appl. No. 13/240,779, entitled "Method and System for Maintaining a Machine Having a Rotor and a Stator."

Final Office Action dated Jan. 27, 2015, in related U.S. Appl. No. 13/240,788, filed Sep. 22, 2011.

Notice of Allowance dated Mar. 1, 2016, in related U.S. Appl. No. 13/240,788, entitled "Module-Handling Tool for Installing/Removing Modules Into/From an Electromagnetic Rotary Machine Having a Modularized Active Portion."

Amendment and Response to Final Office Action dated Oct. 13, 2015, in related U.S. Appl. No. 13/240,779, entitled "Method and System for Maintaining a Machine Having a Rotor and a Stator."

Notice of Allowance dated Nov. 10, 2015, in related U.S. Appl. No. 13/240,779, entitled "Method and System for Maintaining a Machine Having a Rotor and a Stator."

Amendment and Response to First Office Action dated Nov. 14, 2015, in related U.S. Appl. No. 13/240,788, entitled "Module-Handling Tool for Installing/Removing Modules Into/From an Electromagnetic Rotary Machine."

PCT International Search Report dated Sep. 23, 2012 for related PCT/US2011/052893 entitled "Sectionalized Electromechanical Machines Having Low Torque Ripple and Low Cogging Torque Characteristics," Petter et al.

Bianchi, N. et al., "Design Techniques for Reducing the Cogging Torque in Surface-Mounted PM Motors," IEEE Transactions on Industry Applications, Sep./Oct. 2002, 1259-1265, vol. 38, No. 5.

Response to Restriction Requirement dated Jul. 14, 2014, in related U.S. Appl. No. 13/240,788, filed Sep. 22, 2011.

Office Action dated Jul. 29, 2014, in related U.S. Appl. No. 13/240,788, filed Sep. 22, 2011.

Office Action dated Jun. 10, 2014, in related U.S. Appl. No. 13/240,779, filed Sep. 22, 2011.

Restriction Requirement dated Mar. 11, 2014, in related U.S. Appl. No. 13/240,779, filed Sep. 22, 2011.

(56) References Cited

OTHER PUBLICATIONS

Restriction Requirement dated Mar. 13, 2014, in related U.S. Appl. No. 13/240,788, filed Sep. 22, 2011.
Response to Office Action dated Mar. 19, 2014, in related U.S. Appl. No. 13/240,756, filed Sep. 22, 2011.
Notice of Allowance dated Mar. 28, 2014, in related U.S. Appl. No. 13/240,756, filed Sep. 22, 2011.
Office Action dated Dec. 19, 2013, in related U.S. Appl. No. 13/240,756, filed Sep. 22, 2011.
Response to Final Office Action dated Oct. 25, 2013, in related U.S. Appl. No. 13/240,768, filed Sep. 22, 2011.
RCE dated Oct. 25, 2013, in related U.S. Appl. No. 13/240,768, filed Sep. 22, 2011.
Response to Office Action dated Jun. 25, 2013, in related U.S. Appl. No. 13/240,768, filed Sep. 22, 2011.
Final Office Action dated Aug. 6, 2013, in related U.S. Appl. No. 13/240,768, filed Sep. 22, 2011.
Office Action dated Mar. 15, 2013, in related U.S. Appl. No. 13/240,768, filed Sep. 22, 2011.
"Cogging Torque Minimization Technique for Multiple-Rotor, Axial-Flux, Surface-Mounted-PM Motors: Alternating Magnet Pole-Arcs in Facing Rotors," by Metin Aydin, Ronghai Qu, and Thomas A. Lipo, Industry Applications Conference, 38th IAS Annual Meeting, Oct. 12-16, 2003.
"Nature and Measurements of Torque Ripple of Permanent-Magnet Adjustable-Speed Motors," by John S. Hsu, Brian P. Scoggins, Matthew B. Scudiere, et al., Industry Applications Convference, 1995, 30th IAS Annual Meeting, Oct. 8-12, 1995.
Oxford English Dictionary, Definition of "integra," Mar. 17, 2013.
PCT International Search Report dated Mar. 15, 2012 for related PCT/US2011/052882 entitled "Electromagnetic Rotary Machines Having Modular Active-Coil Portions and Modules for Such Machines," Cole et al.
PCT International Search Report dated Mar. 19, 2012 for related PCT/US2011/052879 entitled "Method and System for Servicing a Horizontal-Axis Wind Power Unit," Bywaters et al.
PCT International Search Report dated Jan. 20, 2012 for related PCT/US2011/052885 entitled "Module-Handling Tool for Installing/Removing Modules Into/From an Electromagnetic Rotary Machine," Bywaters et al.
Related U.S. Appl. No. 13/240,756, Method and System for Servicing a Horizontal-Axis Wind Power Unit, filed Sep. 22, 2011.
Related U.S. Appl. No. 13/240,768, Electromagnetic Rotary Machines Having Modular Active-Coil Portions and Modules for Such Machines, filed Sep. 22, 2011.
Related U.S. Appl. No. 13/240,779, Method and System for Maintaining a Machine Having a Rotor and a Stator, filed Sep. 22, 2011.
Related U.S. Appl. No. 13/240,788, Module-Handling Tool for Installing/Removing Modules Into/From an Electromagnetic Rotary Machine, filed Sep. 22, 2011.
Related U.S. Appl. No. 14/511,143, Design Process for Low Cogging Torque and Low Torque Ripple Permanent Magnet Machine Rotor and Permanent Magnet Machine Designed Thereby, filed Oct. 9, 2014.
Office Action dated Jul. 17, 2015, in related U.S. Appl. No. 13/240,788, entitled "Module-Hanlding Tool for Installing/Removing Modules Into/From an Electromagnetic Rotary Machine."
Office Action dated Jan. 29, 2015, in related U.S. Appl. No. 13/240,779, entitled "Method and System for Maintaining a Machine Having a Rotor and a Stator."
Response to Office Action dated Apr. 29, 2015, in related U.S. Appl. No. 13/240,779, entitled "Method and System for Maintaining a Machine Having a Rotor and a Stator."
Response to Final Office Action dated Apr. 27, 2015, in related U.S. Appl. No. 13/240,788, filed Sep. 22, 2011, titled "Module-Handling Tool for Installing/Removing Modules Into/From an Electromagnetic Rotary Machine."

* cited by examiner

SECTIONALIZED ELECTROMECHANICAL MACHINES HAVING LOW TORQUE RIPPLE AND LOW COGGING TORQUE CHARACTERISTICS

RELATED APPLICATION DATA

This application is a divisional of U.S. Nonprovisional patent application Ser. No. 13/240,731, filed Sep. 22, 2011, entitled "Sectionalized Electromechanical Machines Having Low Torque Ripple and Log Cogging Torque Characteristics," (which will issue as U.S. Pat. No. 8,912,704 on Dec. 16, 2014); and which application claims the benefit of priority of U.S. Provisional Patent Application Ser. No. 61/385,660, filed on Sep. 23, 2010, and titled "Sectionalized Electromechanical Machines Having Low Torque Ripple and Low Cogging Torque Characteristics." Each of these applications is incorporated by reference herein in its entirety.

FIELD OF THE INVENTION

The present invention generally relates to the field of electromechanical machines. In particular, the present invention is directed to a sectionalized electromechanical machine having low torque ripple and low cogging torque characteristics.

BACKGROUND

Electromechanical machines, i.e., generators or motors, may be designed and configured in a wide variety of sizes—from, for example, relatively small diameter servomotors and automobile alternators to relatively large diameter hydroelectric turbines and powerful electric motors for ship propulsion or other uses. Given the size of some of these machines, there has been interest in creating machines from a compellation of smaller components, such as segmented rotors or stators, to allow for ease in manufacturing, installation, and maintenance. However, segmented designs to date have had a variety of drawbacks such as increased expense due to more difficult manufacture and maintenance, greater possibility of damage to coils, lost torque, and/or increase in torque ripple and cogging torque. One known way to simplify manufacture and maintenance, and to reduce cost, is to employ a less complex design.

One example of a less complex design for electromechanical machines is a single tooth, concentric wound design. In this design each tooth of the stator or rotor is wound with a single coil of wire concentrically around the tooth. While this design can be less expensive than more complex winding patterns, it can suffer from even more significant negative effects due to cogging torque and torque ripple. To address these problems, various tooth skewing schemes have been developed but these again raise cost of the design and can be incompatible with segmented designs due to the difficulty of assembly.

SUMMARY OF THE DISCLOSURE

The present disclosure is directed to an electromechanical machine having rotor poles and stator poles that cooperate to generate electricity from rotation or convert electricity to rotation, comprising inner and outer structures, at least one of said structures rotating relative to the other of said structures with the rotor poles disposed on the rotating structure and the stator poles disposed on the other structure, at least one of said structures including a plurality of sections, wherein the poles of said structure including the plurality of sections are arranged in sets of wound poles formed on teeth having a depth; a set of said poles is disposed in each one of said plurality of sections and each set has two end poles, one at each section end; the end poles are spaced from the section ends by an end space at each section end, the end space having a width of approximately the distance from the end pole winding to the section end, and a depth of approximately the depth of the wound pole teeth to define an end space area; and an unwound tooth is disposed in each said end space, the unwound teeth occupying not more than 90% of said end space area.

In another implementation, the present disclosure is directed to a stator for an electromechanical machine. The stator includes wound stator poles formed on teeth having a depth, wherein the wound poles are arranged a plurality of sections each comprising a set of wound poles with two wound end poles, one at each section end; the wound end poles are spaced from the section ends by an end space at each section end, the end space having a width of approximately the distance from the end pole winding to the section end, and a depth of approximately the depth of the wound pole teeth to define an end space area; and at least one unwound tooth is disposed in the end spaces defined by adjacent section end, the unwound teeth occupying not more than 90% of the total end space area of the adjacent sections.

In yet another implementation, the present disclosure is directed to a method for arranging wound stator poles in an electromechanical machine to reduce torque ripple, the wound poles being formed on teeth having a depth. The method includes conceptually dividing the stator poles into a plurality of sections to provide a sectionalized stator with each section having ends adjacent a next section; arranging the poles of the sectionalized stator in a plurality of sets of poles, each set disposed within one said section and having two end poles, one at each section end; and positioning the poles within each set at a section pole pitch, the section pole pitch being a function of the frequency of the torque ripple harmonic to be at least reduced in operation of the machine; positioning the end poles of adjacent sections at a boundary pole pitch, the boundary pole pitch being a function of the section pole pitch; spacing the end poles from the section ends by an end space at each section end, the end space having a width of approximately the distance from the end pole winding to the section end, and a depth of approximately the depth of the wound pole teeth to define an end space area; and disposing an unwound tooth in each said end space, the unwound teeth occupying not more than 90% of said end space area.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

An electromechanical machine as referred to herein is a machine for the generation of electrical energy from mechanical work, e.g., producing electricity from the rotation of turbine blades, or the conversion of electrical energy to mechanical work, e.g., the use of electricity to rotate an object. Generally, the present disclosure is directed to an apparatus and method including sectionalized stator and rotor designs, and for reducing cogging torque and torque ripple in an electromechanical machine. Embodiments of the invention have particular application to single tooth concentric wound devices, although it may be applicable to other designs as well.

The terms sectionalizing and segmenting are used in many ways in the art with respect to electromechanical machines. For example, they can refer to constructing a rotor or stator of a machine in a plurality of arched or curved sections that can be installed into a structural frame to create a stator or rotor. Sectionalizing, as used herein, means that the rotor or stator are provided in conceptual sections, or, in other words, that the stator or rotor have repeated arched design portions corresponding to each section, but may be generally unitary structures, i.e., the stator or rotor sections are not made from separate pieces. In some embodiments, as described herein below, the sections can be formed as individual segments that are assembled to form a complete rotor or stator.

Sectionalizing a machine in accordance with embodiments of the present invention involves an analysis of the physical layout, e.g., position and numbers of stator and rotor poles, etc., and an electrical layout, e.g., the number of phases, number of circuits, and the coil arrangements, etc. Before describing possible exemplary embodiments of physical and electronic layouts for an electromechanical machine according to embodiments of the invention, terminology is defined and embodiments of exemplary design processes for such a machine are described with respect to FIGS. 1 and 1A.

Those trained in the art of electric machine design will understand the concept of poles and phases. Poles on the stator and rotor are referred to, respectively, as stator poles and rotor poles. For simplicity and clarity of description, the illustrative embodiments discussed herein have three phases on the stator and two phases on the rotor. Other combinations may be used in practice and still fall within the invention. In the exemplary embodiments described herein, the rotor phases are north and south magnetic poles and the stator phases are single tooth, concentrically wound poles. As will be appreciated by persons of ordinary skill in the art, when using magnets for the poles it may be practical to have just two phases, but in a rotor having wound poles there could be any number of phases. If the stator has wound poles, it is possible to have any number of phases as well.

Again, for simplicity and clarity of the concepts and exemplary embodiments described herein, exemplary stator designs use single coil, single tooth concentric wound poles. This also may be a desirable structure for many large machines. However, as will be appreciated by persons of ordinary skill in the art, it is possible to have a single pole formed from a number of teeth and a number of coils. In such a case, the concepts discussed for the present invention are the same, but the description and details are more complex. Thus, for simplicity we use the terms rotor pole and stator pole to refer to either a permanent magnet pole or a wound coil on a tooth on the rotor or stator, respectively. Persons of ordinary skill in the art will be able to apply the teaching of the present invention to even more complex designs.

Certain aspects of the present invention relate to the spacing of the stator or rotor poles. For uniform application, spacing is measured between the pole center lines. For the purposes of the descriptions herein, the center of wound poles are at the center of the teeth around which the wire is wound. The center of the magnetic poles is at the center of the magnets. Previously, the centers of the poles of a machine were generally equally spaced around the machine. However, aspects of the present invention include a structure and method for using unequal spacing to lower torque ripple and cogging torque while minimizing the decrease in torque or power density resulting from the new arrangement.

Figure 1:
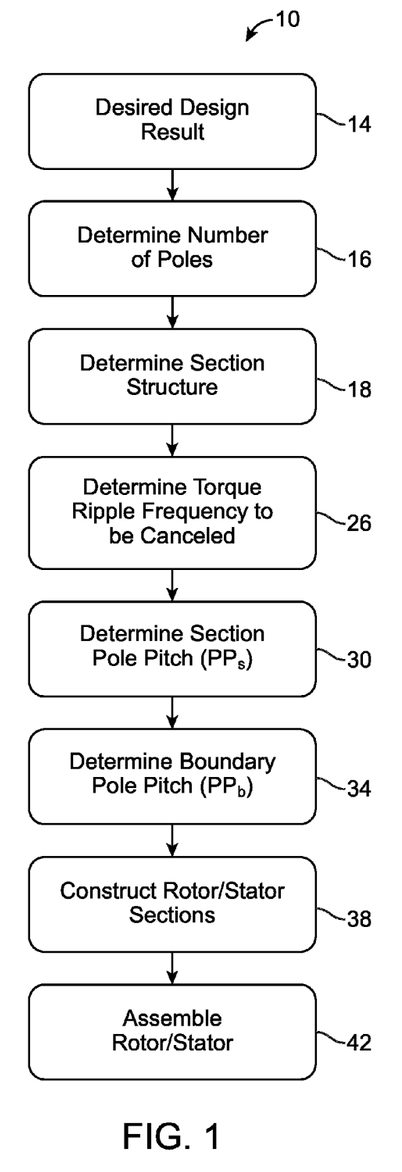
FIG. 1 is a flow diagram illustrating a method of constructing a sectionalized electromechanical machine having low torque ripple and low cogging torque characteristics according to an embodiment of the present invention.

With reference to FIG. 1, in embodiments of the present invention, as is typical of many design processes, designing an electromechanical machine begins with a determination of the desired electrical characteristics of the machine, which dictate the physical layout. For instance, the design for a generator may include, at step 14, an initial determination of the basic configuration, such as the winding type, e.g., single tooth concentric wound, a number of phases, a desired voltage, and/or desired current for the power delivered. As another example, for a motor, step 14 may include an initial determination of the number of phases, a desired torque, or desired speed of the motor shaft. Other initial considerations may be taken into account as determined applicable by persons of ordinary skill in the art.

From the initial desired design of step 14, physical and electrical characteristics may be determined. In one embodiment, a next step 16 would be the selection of the number of poles on each the rotor and stator. Generally, from an electrical layout perspective, and as would be readily understood by those skilled in the art, a next step, step 18, would be a determination of the sectional structure, such as the number of sections and arrangement of poles, including the number of poles per series string and number of sections and circuits. Typically each pole is composed of coil wrapped around a core, frequently called a tooth, a plurality of the coils can be connected together in series to create a string. Each string is then connected in parallel to obtain the desired design result. In an exemplary embodiment, each string of poles should have the same number of poles and an equal number of end poles (poles at the end of a section) so that the strings share current properly. The width of the poles (see, e.g., FIG. 2, reference numeral 144) is another physical parameter that may also be set at this time.

As one parameter, a determination of the number of conceptual sections may be included in step 18. In an exemplary embodiment of design process 10, the number of sections of either the rotor or the stator is a whole number multiple of the number of phases. The choice for the number of sections also may be influenced, in part, by the needs of manufacturing and assembly. Note that in embodiments wherein the winding configuration includes reversed coils, the number of stator phases may be twice the number of electrical phases. In general, persons of ordinary skill in the art may determine the number of sections based on their own applications and preferred parameters taking into account the teachings of the present invention.

Figure 1A:
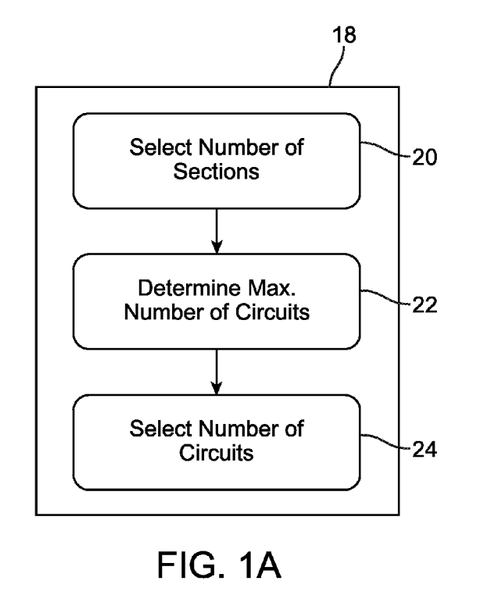
FIG. 1A is another flow diagram illustrating a method of stator design in an alternative embodiment of the present invention.

In one exemplary embodiment, generally applicable to generators or motors that have tooth wound configurations that are sectionalized, step 18 may be broken down into a series of sub-steps for stator design as illustrated in FIG. 1A. In order to provide balanced currents in each parallel circuit of a machine it may be desirable to have an equal number of end poles in each parallel circuit and in each electrical phase of the machine. Although three phase designs generally predominate, it is possible to design and use machines with any integer number of phases. But regardless of the number of phases to be applied in a particular embodiment, in one exemplary embodiment of the invention, the number of poles per section and the arrangement of the poles within the sections is selected with the following design requirements in mind: First, the number of poles per section should be an integer that is not a whole number multiple of the number of phases. Second, each series string of poles should have the same number of poles. Third, each series string of poles should include equal numbers of end poles.

These design requirements can be met by the following sub-steps as illustrated for step 18 in FIG. 1A. In step 20, the number of sections is set to an integer multiple of the number of phases. In step 22, the maximum number of circuits is set as follows: if the number of poles per section is an even number, set the maximum number of circuits as equal to twice the number of sections divided by the number of phases; alternatively, if the number of poles per section is an odd number, set the maximum number of circuits as half the above number. Then, in step 24, the number of circuits is selected from the possible number of circuits, which are the factors of the maximum number of circuits. It will be appreciated by persons of ordinary skill in the art that the steps illustrated in FIG. 1A are just one exemplary method for arriving at a workable arrangement of coils, sections and circuits, in the case that the characteristics of the end pole are different enough to cause possible imbalances in the phase or the circuit's currents, which in turn would cause complex torque ripple patterns. If the end pole characteristics are of no significance, then many other techniques may be employed for arriving at a workable arrangement without departing from the scope of the present invention as set forth in the appended claims.

One result of the above process is illustrated by the following non-limiting example. In an exemplary device having nine sections, with seven coils per section and three phases, the poles may be arranged as |ABCABCA|BCABCAB|CABCABC|ABCABCA|BCAB-CAB|CABCABC|ABCABCA|BCABCAB|CABCABC| where each letter A, B, or C represents a phase that is connected to each pole and each "|" represents a section boundary. Note that for each three sections there are seven of each letter ABC and two of each phase are next to a section boundary. Since in this design the number of coils per section is odd, the maximum number of circuits would be three. Following the design parameters set forth above, there are only two options: one or three circuits.

With reference again to FIG. 1, the overall design process according to an embodiment of the present invention may continue with step 26. The ratio of the number of coils to the number of magnets (pole ratio) generates a characteristic torque ripple at one or more harmonic integer multiples of the fundamental frequency and a resultant cogging torque harmonic. The harmonic integer of the frequency that is to be eliminated or reduced is identified at step 26. In general, and as would be apparent to one skilled in the art, an electromechanical machine generates numerous harmonics of the characteristic torque ripple frequency, each of which has a varying amount of influence on machine operation. Thus, the chosen harmonic torque ripple frequency to be canceled will generally be the one with the greatest influence on the operation of the machine, e.g., the dominant harmonic torque ripple frequency.

Torque ripple and cogging torque may then be reduced or eliminated by appropriate arrangement of the spacing of poles within sections and across the boundaries between adjacent sections in either the rotor or stator. In one embodiment of the invention, this can be accomplished at steps 30 and 34 based on only a small number of selected parameters: the number of poles, the number of phases, the number of sections and a balancing factor.

Using the above parameters, the pole pitch within each section is calculated in step 30 using Equation 1 as follows:

$$PPs = \frac{360}{P} \times \left(1 - \frac{N \times Ph \times X}{H \times P}\right) \qquad \text{[Equation 1]}$$

where:
PPs is the section pole pitch;
P is the number of poles;
Ph is the number of phases;
H is the harmonic number to be eliminated;
N is the number of sections; and
X is a factor in the range of greater than zero to one.

When cogging torque is reduced by the sizing of the boundary pole pitch as described above, it can also be accompanied by a reduction in the torque density produced by the electromechanical machine. Such a reduction in torque density may or may not be desirable in particular, case-specific applications. Balancing factor X in Equation 1 allows such considerations to be taken into account to balance desired cogging torque reduction with the undesired loss of torque density when determining the section pole pitch in particular designs. In applications where torque ripple is a primary concern, X may be set as 1. However, in applications where reduction in torque density is a factor to be considered, the section pole pitch may be increased by selecting X at a value less than one. As can be seen from Equation 2 below, increasing the section pole pitch also reduces the boundary pole pitch to provide a more even spacing of the poles around the machine, which will provide increased torque density while lowering the reduction in cogging torque to a degree. A person skilled in the art will be able to select balancing factor X to achieve the best balance between parameters for a particular application based on the teachings contained herein. In one exemplary embodiment, balancing factor X is selected to be in the range of about 0.45 to about 0.95. In another embodiment, balancing factor X is in the range of about 0.60 to about 0.90.

Next, at step 34, the boundary pole pitch, the center to center distance between adjacent end poles across section divisions, is calculated according to Equation 2 based on the calculated section pole pitch as follows:

$$PPb = \left(\frac{360 - (P \times PPs)}{N}\right) + PPs \qquad \text{[Equation 2]}$$

where:
PPb is the boundary pole pitch;
PPs is the section pole pitch;
P is the number of poles; and
N is the number sections.

Using Equations 1 and 2 above, the sections of either a rotor or stator, wound or permanent magnet, may be arranged to reduce or eliminate a selected torque ripple harmonic. (In the case of a permanent magnet rotor the number of phases will be two—north and south). To construct the rotor/stator section(s) at step 38, the poles are arranged within each section with their centers at the section pole pitch and the last pole at each end of the section spaced from the section edge by one-half the boundary pole pitch. Tooth/coil or magnet sizes as previously selected still apply with the only caveat being that they should not be so large as to overlap when spaced at the calculated section pole pitch. Embodiments and examples of the construction of rotor and stator sections, whether segmented or not, are described in more detail below. If the stator or rotor are individual segments, the segments may then be assembled at step 42. It will be appreciated by persons of ordinary skill in the art that the design process steps illustrated in FIGS. 1 and 1A need not be followed linearly as depicted. Steps may be looped or reordered as appropriate to a particular design or process.

Figure 2:
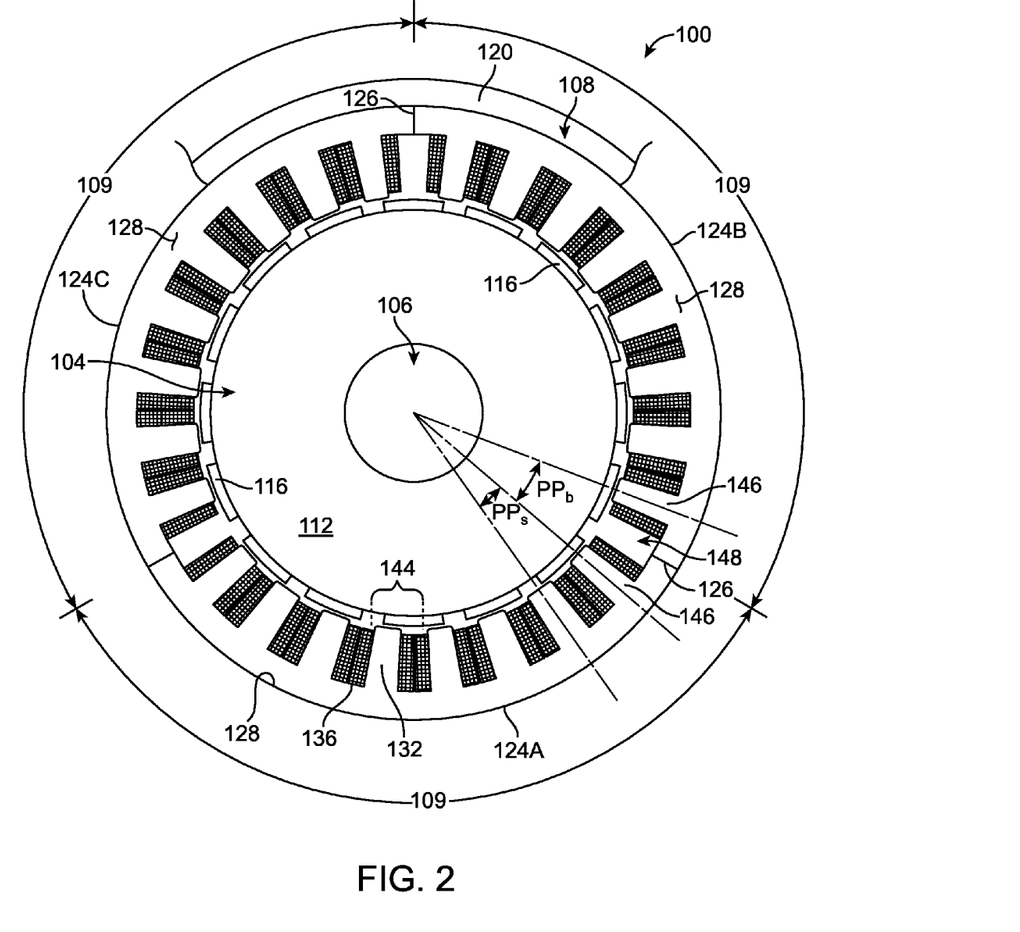
FIG. 2 is a plan view of an electromechanical machine having a segmented stator according to an embodiment of the present invention.

FIG. 2 shows an exemplary embodiment in which electromechanical machine 100 has a sectionalized and segmented stator design according to the present invention. Electromechanical machine 100 has, among other things, a rotor assembly 104 and a stator assembly 108. In this embodiment, the wound stator poles of the stator assembly are arranged in sections 109, wherein each section is an individual segment 124A-C as described below. Typically, rotor assembly 104 and stator assembly 108 have a common central axis and reside within a housing (not shown). In general, rotor assembly 104 is rotated by a shaft 106, or other mechanism known in the art, that is acted upon by an external force, e.g., the wind, or the rotor assembly may rotate the shaft by being acted upon by stator assembly 108, e.g., by periodic excitement of the coils 136. In the above described exemplary configuration, stator assembly 108 remains stationary. Stator assembly 108 includes a stator frame 120, carrying plural stator segments 124A-C that each include a stator back iron 128 and a plurality of inwardly directed teeth 132 (also sometimes called cores). Coils 136 are wound on teeth 132 to provide wound poles 144. End poles 146 are located at the end of each section. In the case of wound poles 144, an end space 148 is presented between the end coils on end poles 146 that represent a space where a skipped tooth or pole would have been disposed in a conventional design.

Stator back iron 128 may be fabricated out of materials known in the art, such as various metals, composites, or other materials with sufficient rigidity and electrical characteristics, with laminated or solid construction, to meet the desired design specifications. The teeth (cores) may be disposed on the back iron or fabricated as a unitary body with the back iron, and are also made of materials known in the art.

Rotor assembly 104 includes plural magnets 116 disposed at least about equally around the surface of rotor member 112. Magnets 116 are typically, although not necessarily, permanent magnets composed of materials known in the art, such as composite metals or rare earth magnets. Rotor member 112 is generally annular and may be fabricated out of materials readily apparent to those skilled in the art such as various metals, composites, or other materials with sufficient rigidity to maintain the annular shape of rotor member 112 under rotational stress. The attachment of magnets 116 to rotor member 112 may be accomplished by means well known in the art.

With reference again to the design process as described above, as an example, assume machine 100 in FIG. 2 is a three-phase machine with a pole ratio of stator poles 144 to magnets 116 of three to two; for example, twenty-four stator poles and sixteen rotor poles. A machine with this configuration might be expected to have a dominant torque ripple frequency at the sixth harmonic integer of the electrical frequency. To at least substantially cancel this frequency, the stator poles may be arranged according to Equation 1 above. Based on already determined design parameters, the number of poles (P), in this case stator poles, is 24, the number of phases (Ph) is 3, the harmonic to be eliminated (H) is 6 and the number of sections (N) is 3. Thus, for maximum cogging torque reduction with balancing factor X set as 1, the section pole pitch (PPs) within each section is calculated to be 14.0625 mechanical degrees.

The end poles 146 are then spaced from the section ends 126 by a distance equal to one-half the boundary pole pitch (PPb), calculated according to Equation 2 above. Based on the above parameters, the boundary pole pitch is 21.5625 mechanical degrees, one-half of which is 10.78125 mechanical degrees. If the width of the teeth 132 is hypothetically selected at 7.0 degrees, the slot between teeth in each section would be 7.0625 degrees, and the space at the end of each section, to the outside of the end teeth would be 7.28125 mechanical degrees. The unoccupied end space 148 between windings at the ends of segments or sections may or may not be occupied by unwound end teeth as discussed in more detail below.

Alternatively, as described above, if it were determined desirable to increase the torque density while lowering the reduction in cogging torque, balance factor X may be set at a value of less than one, for example at 0.85. With a balancing factor X of 0.85 and all other parameter being as established above, the section pole pitch is 14.2031 mechanical degrees. Using this modified section pole pitch, the boundary pole pitch is again calculated as above using Equation 2. (Note: setting the value of X to 0 yields a result of PPs=PPb=15 degrees, which is equally spaced poles as in a traditional machine.)

Although the configuration of electromechanical machine 100, as shown in FIG. 2, indicates that stator assembly 108 with the previously specified components encircles rotor assembly 104 (described as an "inside rotating configuration"), other configurations of electromechanical machine 100 would be readily apparent to those skilled in the art. For instance, the rotor assembly may encircle the stator assembly (described as an "outside rotating configuration"), or the rotor assembly may include a plurality of cores and a plurality of coils as poles, while the stator assembly may include a plurality of magnets as poles. Described below are further exemplary embodiments with inside rotating configurations having stator assemblies including cores and coils, and rotor assemblies including magnets, although the invention is not limited by these exemplary configurations. In addition, more than one rotor assembly/stator assembly may be used in an electromechanical machine according to the invention, such as where rotor assemblies and stator assemblies exist in a stacked configuration (not shown). Those skilled in the art would readily appreciate that the embodiments and methodology taught herein are applicable to electromechanical machines utilizing multiple rotor assemblies and stator assemblies in various configurations. In another alternative, although only three segments are shown in FIG. 2, as would be apparent to those skilled in the art, more or fewer segments are possible.

Figure 3:
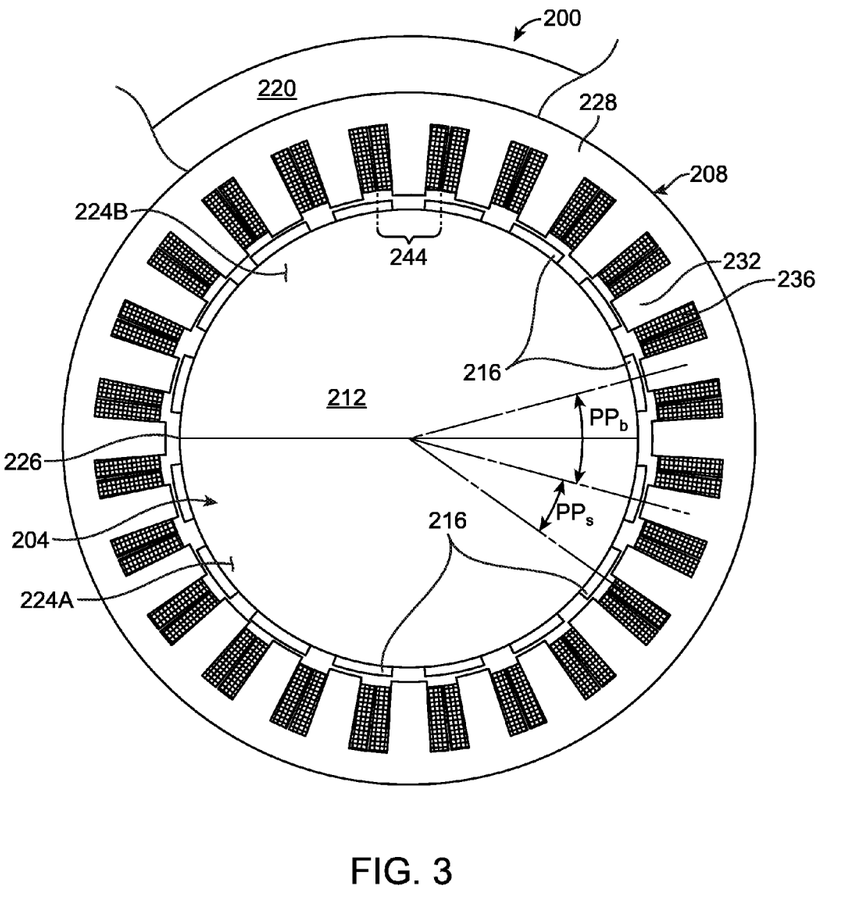
FIG. 3 is a plan view of a portion of an electromechanical machine having a segmented stator according to an alternative embodiment of the present invention.

Another exemplary embodiment is illustrated in FIG. 3, wherein the configuration of the rotor assembly is arranged according to the exemplary methodology to eliminate or reduce undesired torque ripple frequencies. In this example, machine 200 includes a rotor assembly 204 with a rotor member 224 comprising plural sections 224A and 224B and a plurality of poles 216 disposed there around. In this example there are sixteen poles and two rotor sections. Although machine 200 shows two distinct rotor segments forming sections 224A and 224B, in other embodiments the rotor sections may be conceptual sections that form an undivided rotor member. Stator assembly 208 may include a stator frame 220, a stator back iron 228, a plurality of teeth 232 and a plurality of coils 236 that surround teeth 232 to form stator poles 244. Teeth 232, generally, although not necessarily, extend radially toward the central axis of stator assembly 208 an amount sufficient to provide for coils 236, but not so far as to interfere with the movement of rotor assembly 204.

By way of non-limiting example, the design and configuration of a machine consisting of sixteen rotor poles 216 and twenty-four stator poles 244 may, if constructed by typical procedures used in the art, generate, as a predominant frequency, a sixth harmonic torque ripple frequency. In this example, in order to at least substantially cancel the sixth harmonic torque ripple frequency, the configuration of the rotor assembly is modified in accordance with the exemplary methodology described above as follows.

Applying Equation 1 to the rotor assembly and permanent magnets (rotor poles) (P=16, N=2, Ph=2, H=6), the pole pitch in each section (PPs) is calculated to be 21.5625 mechanical degrees if the balancing factor X is set at 1. Next, using Equation 2, the boundary pole pitch (PPb) is calculated to be 29.0625 mechanical degrees. Thus the centers of each pole at the end of each section are spaced at one-half the boundary pole pitch, or 14.53125 mechanical degrees from each section edge 226.

In this case the magnet width corresponds to the width of the rotor poles. Thus, the distance between magnets follows from the section pole pitch. For example if the magnet width were selected as being 20 mechanical degrees, when spaced at a section pole pitch of 21.5625 mechanical degrees, the distance between magnets would be 1.5625 degrees. Using these parameters, the exemplary machine may be constructed and assembled as described at steps 38 and 42 of FIG. 1.

Figure 4:
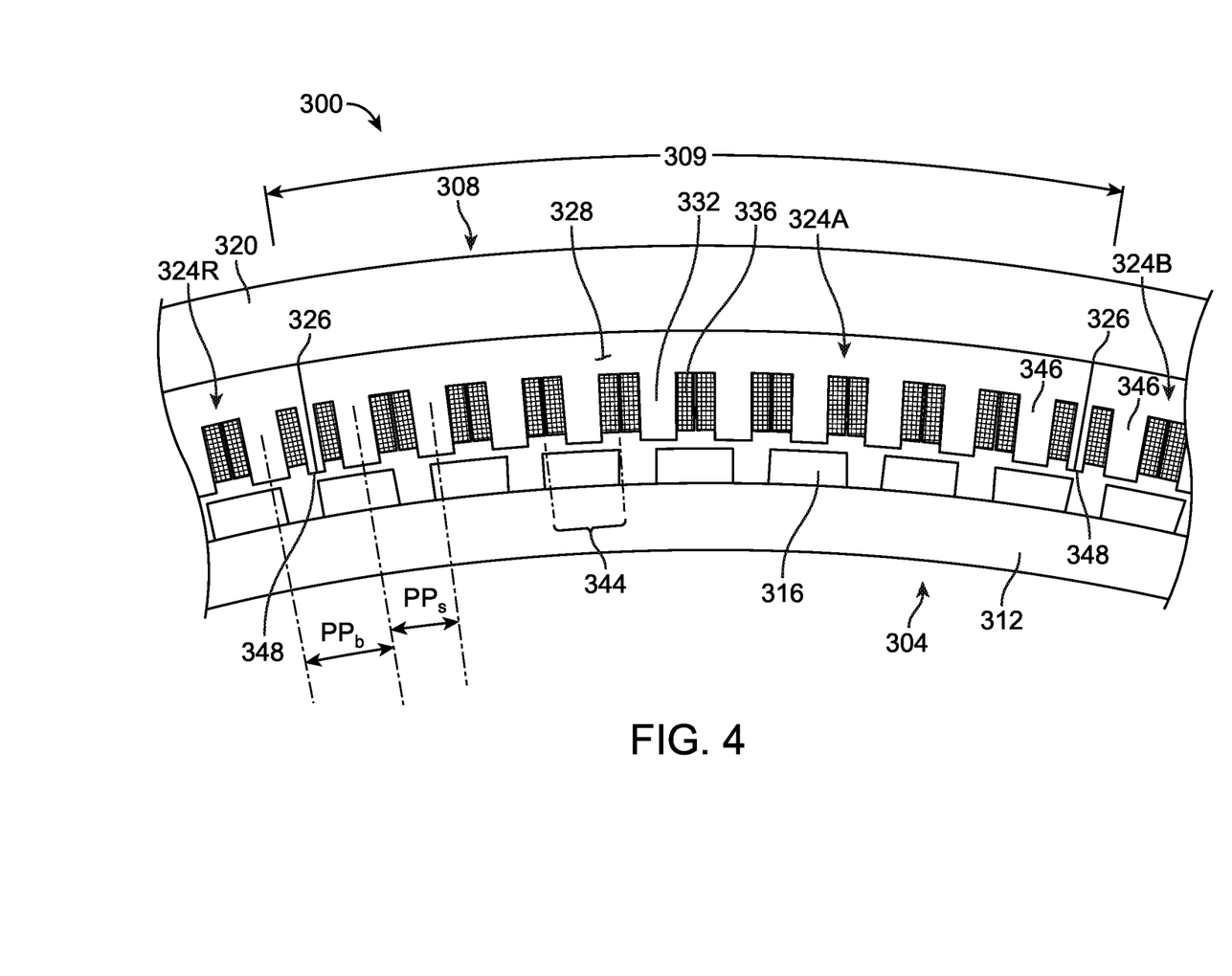
FIG. 4 is a plan view of an electromechanical machine having a sectionalized stator according to another embodiment of the present invention.

Electromechanical machine 300 as shown in FIG. 4 illustrates a further alternative exemplary embodiment of the present invention in which stator assembly 308 is formed with sections 309 provided as individual segments. The design and configuration of stator assembly 308 and machine 300 is similar to that of machine 100, as machine 300 includes a rotor assembly 304 that may include a rotor member 312 and a plurality of magnets 316. Stator assembly 308 may include a stator frame 320, and a plurality of stator segments 324 with a stator back iron 328, a plurality of inwardly extending teeth 332 and a plurality of coils 336. With the segmented design, section ends 326 also correspond to the physical ends of the segments. In this example, the basic structure is selected as a three-phase machine comprising eighteen separate stator segments 324A-R (all segments not shown), each including ten poles for a total of 180 poles. Teeth 332 are selected with a width of 1.0 degrees. Teeth 332 and coils 336 are paired to form stator poles 344. In this embodiment, the space between end poles 346 is occupied by unwound end teeth 348, which are formed by two halves, one on each section/segment end 326.

Again, using Equation 1 with balancing factor X set as 1, and assuming the sixth harmonic integer is to be eliminated or reduced, the section pole pitch (PPs) is calculated to be 1.90 mechanical degrees (P=180, Pu=3, N=18, H=6). Based on this determination, the center of the end pole 346 in each section is spaced 0.45 mechanical degrees from section end 336, i.e. one-half the boundary pole pitch (PPb), as calculated with Equation 2. From these dimensions a person of ordinary skill in the art can construct an electromechanical machine according to this example that at least substantially eliminates torque ripple at the sixth harmonic frequency. As seen in FIG. 4, each segment 324 has end teeth 348. When machine 300 is assembled, end teeth 348 from neighboring segments may combine to form a divided unwound, skip tooth.

Persons of ordinary skill in the art will be able to derive any number of working formulas based on the basic approach as taught above in order to provide methodology that may be more convenient to specific design considerations without departing from the spirit and scope of the present invention. For example, in one alternative derivation applicable in particular to designs wherein the arrangement of wound stator poles is to be adjusted, the spacing of end poles may be initially determined dividing 360 electrical degrees by the identified harmonic integer corresponding to the frequency to be reduced, which results in the spacing being approximately equal to the torque ripple frequency wave length. Alternatively, the spacing is determined in mechanical degrees according to Equation 3:

$$Ss = X*720/(H*Pr) \qquad \text{[Equation 3]}$$

where:
Ss is the sector spacing in mechanical degrees for the stator (this parameter corresponds to the boundary pole pitch minus the sector pole pitch ($PP_b$–PPs) as calculated above);
H is the harmonic integer associated with the harmonic torque ripple frequency to be reduced or eliminated;
Pr is the number of rotor poles; and
X is a factor in the range of greater than zero to one.

As described above, balancing factor X may be applied to adjust the balance between cogging torque reduction and loss of torque density.

Using this derivation, the pole pitch on the stator may then be determined by subtracting the spacing, Ss, from the electrical degree span of the segment, i.e., angular measurement around the circumference of the machine in electrical degrees divided by the number of segments, and then dividing that result by the number of poles in the segment. In mechanical degrees, the pole pitch within each segment can alternatively be determined using Equation 4:

$$PPs = \frac{(360/N) - Ss}{P_S} \qquad \text{[Equation 4]}$$

where:
PPs is the stator pole pitch within a sector in mechanical degrees;
N is the number of sections;
Ss is the sector spacing in mechanical degrees; and
Ps is the number of poles per stator segment.

Given this information, the stator segments may then be constructed. To do so, the distance, D, between the teeth of wound poles may be calculated using Equation 5:

$$D=PP-Wt \qquad \text{[Equation 5]}$$

where:
PP is the stator pole pitch in mechanical degrees;
Wt is the angular width of the stator tooth; and
D is the angular distance between stator teeth, e.g. the slots of a stator core.

With the distance, D, determined, a person of ordinary skill in the art may construct the physical or conceptual sections with the determined pole pitch and distance between poles to at least substantially eliminate the selected torque ripple harmonic.

Figure 5:
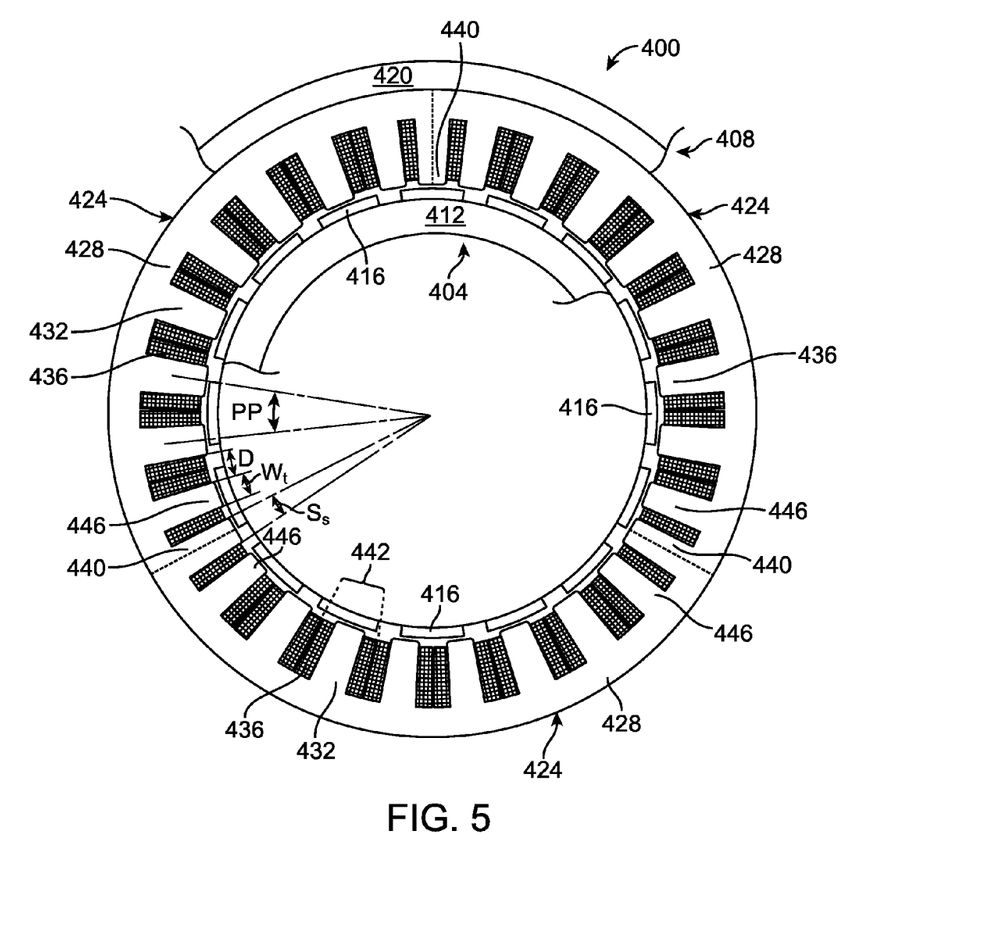
FIG. 5 is a plan view of an electromechanical machine having a segmented rotor design according to an embodiment of the present invention.

FIG. 5 shows a further alternative embodiment of machine 400 having a three stator pole to two rotor pole pole ratio, i.e., twenty-four coils to sixteen magnets. Machine 400 includes a rotor assembly 404 with a rotor member 412 that supports magnets 416. Stator assembly 408 may include a stator frame 420, and a plurality of stator sections 424 that include a stator back iron 428, a plurality of teeth 432 and a plurality of coils 436 as previously described. However, in this case sections 424 are not formed as individual segments as the stator is a single piece construction. Teeth 432 and coils 436 are once again paired to form stator poles 442.

As would be understood by those skilled in the art, in a typical prior art rotor, with this basic design, rotor poles 416 normally would be spaced about equally around the circumference at, in this example, about 22.5 mechanical degrees (180 electrical degree) intervals. The twenty-four stator poles 442 also would be typically spaced equally around the stator assembly 408, at about 15.0 mechanical degree (120 electrical degree) intervals. However, in this exemplary embodiment of the invention, in order to at least substantially cancel a torque ripple frequency, skip teeth 440 are added and sized using Equations 3-5 as described above. For example, if one desires to cancel the sixth harmonic frequency and thus sets the balancing factor X as 1, spacing Ss will be 7.5 mechanical degrees. Pole pitch, PP, will thus be 14.0625 mechanical degrees and the slot width, D, between teeth will be 7.0625 degrees, assuming a tooth width, Wt, of 7.0 degrees. Skip teeth 440 are disposed within the space between end poles 446, but since the stator is of unitary construction, skip teeth 440 are also unitary.

Figure 6A:
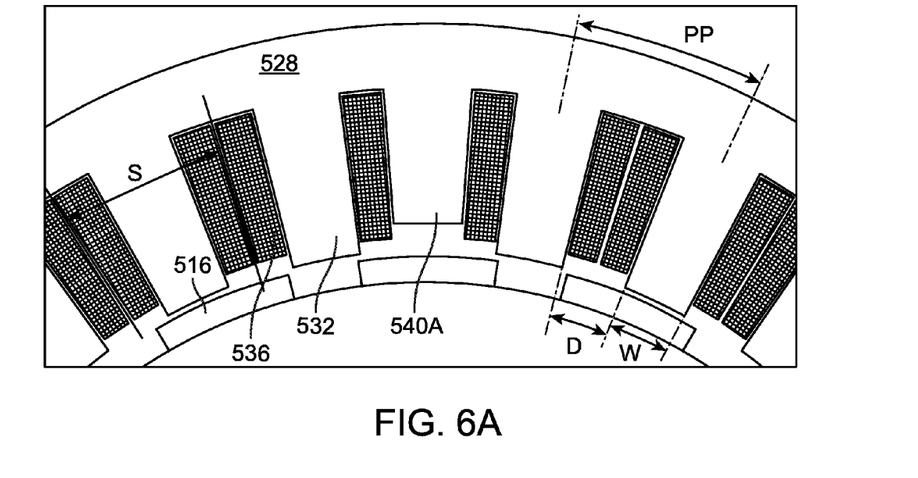
FIGS. 6A-C are partial plan views of alternative embodiments of the present invention employing varying end tooth configurations.
Figure 6B:
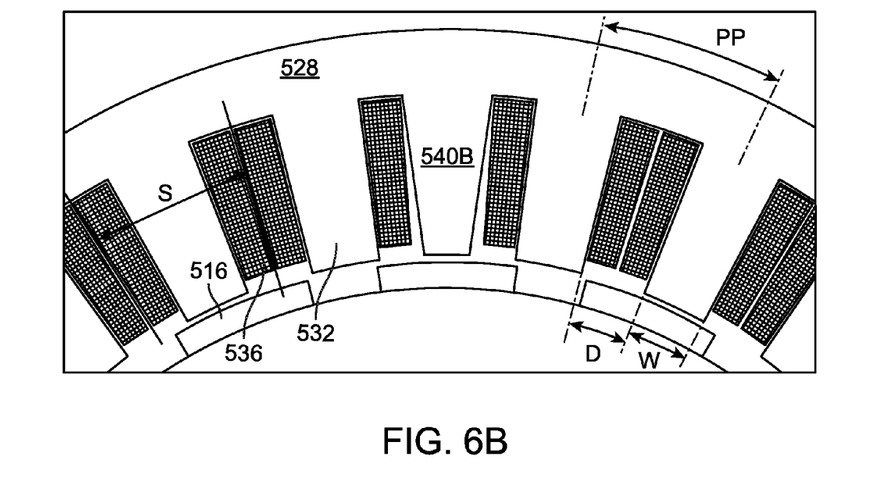
Figure 6C:
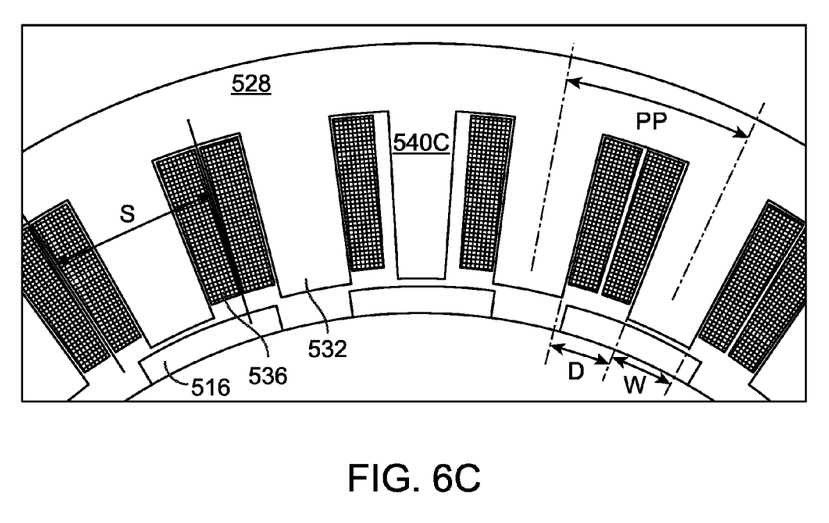

The configuration of skip or unwound teeth, such as end teeth 348 in FIG. 4 or skip teeth 440 in FIG. 5, can be adjusted to further optimize machine performance in further alternative embodiments. Exemplary designs of skip teeth in this regard are shown in FIGS. 6A-C, illustrating three alternative embodiments each with magnets 516, teeth 532, coils 536 and back irons 528. In the case of a full skip tooth, e.g., as in FIG. 5, the leakage inductance of the end poles will be somewhat higher than the other poles since the end slots are narrower than the others. Conversely in the case of a very short or no end tooth, as in FIG. 2, the leakage inductance is lower. Thus, an intermediate shape can be chosen that will provide similar leakage inductance closer to the internal sector poles.

A wide variety of shapes may be selected for skip or unwound end teeth to influence leakage inductance. For example, FIG. 6A shows a short skip tooth 540A, FIG. 6B shows a tapered skip tooth 540B, and FIG. 6C shows a thin skip tooth 540C. These are just a limited sampling of the many shapes that may be selected by a person of ordinary skill in the art based on the teachings herein. Any shape can be tuned to provide a desired leakage inductance for the stator. Leakage inductance is just one of the parameters that affect the performance of this end coil. Another parameter is rotor magnet flux coupling. The rotor flux coupling can generally be controlled by adjusting the amount of the skip tooth that is near the rotor and how far it is from the rotor. The exact shape and dimensions of the skip tooth are functions of many generator design details and must be adjusted for each design. It will depend on choices of parameters such as the air gap between the rotor and stator, the tooth width, the slot width, and the desired performance at full or partial power as may be determined by a person of ordinary skill in the art (for a particular application) based on the teachings continued herein.

In one exemplary embodiment, skip teeth may be configured to employ features of each of the embodiments of FIGS. 6A-C. In other words, the skip teeth may be short skip teeth with a trapezoidal shape wherein the base is narrower than the available end space. In one such exemplary embodiment the skipped teeth may have a depth from stator back iron 528 of about 125 mm as compared to the full depth of about 133 mm of wound teeth 532 (i.e. about 8 mm shorter), such that the depth of the skip tooth is about 94% of the depth of the wound teeth, a base that is 50% less than the available width of the end space, and, also taking into account the trapezoidal shape, the end space area between coils 536 of the end poles may be only approximately 68% filled by a skip tooth. In general the end space area may be not more than 90% occupied by an unwound tooth. In other embodiments the end space area may be between about 55% and about 80% filled by a skip tooth. When a short tooth type design is employed as illustrated in FIG. 6A, the short skip tooth may have a depth of about 90% to about 98% of the wound teeth. Alternatively, the skipped teeth may be about 5-15 mm shorter than adjacent wound teeth. It will be appreciated by persons of ordinary skill in the art that the solid skip teeth as shown in FIGS. 6A-C may also be formed in parts when segmented designs are employed as illustrated, for example, by end teeth 348 in FIG. 4. For example, the skipped tooth may be added as a separate component.

Exemplary embodiments have been disclosed above and illustrated in the accompanying drawings. It will be understood by those skilled in the art that various changes, omissions and additions may be made to that which is specifically described herein without departing from the spirit and scope of the present invention. For example, as will be readily appreciated by persons of ordinary skill in the art, the decision to cancel the 6th harmonic in the foregoing examples is a design parameter based on specific applications utilized only for illustration purposes herein. Other individual harmonics may be targeted as determined for a particular design, without departing from the scope of the invention.

What is claimed is:

1. An electromechanical machine having rotor poles and stator poles that cooperate to generate electricity from rotation or convert electricity to rotation, comprising inner and outer structures, at least one of said structures rotating relative to the other of said structures with the rotor poles disposed on the rotating structure and the stator poles disposed on the other structure, at least one of said structures including a plurality of sections, wherein:

the poles of said structure including the plurality of sections are arranged in sets of wound poles formed on teeth having a depth;

a set of said poles is disposed in each one of said plurality of sections and each set has two end poles, one at each section end;

the end poles are spaced from the section ends by an end space at each section end, the end space having a width of approximately the distance from the end pole winding to the section end, and a depth of approximately the depth of the wound pole teeth to define an end space area; and an unwound tooth is disposed in each said end space, the unwound teeth occupying not more than 90% of said end space area.

2. An electromechanical machine according to claim 1, wherein the unwound teeth occupy approximately 55-80% of the end space area.

3. An electromechanical machine according to claim 1, wherein the unwound teeth have a depth of approximately 90-98% of the wound pole teeth.

4. An electromechanical machine according to claim 1, wherein the unwound teeth have a trapezoidal shape.

5. An electromechanical machine according to claim 1, wherein the unwound teeth have a substantially rectangular shape and a depth less than the wound pole teeth depth.

6. An electromechanical machine according to claim 1, wherein the unwound teeth have a substantially rectangular shape and a width less than the end space width.

7. An electromechanical machine according to claim 1, wherein the end spaces of adjacent sections are occupied by a single unwound tooth.

8. An electromechanical machine according to claim 1, wherein the end spaces of adjacent sections are occupied by separate unwound teeth.

9. An electromechanical machine according to claim 1, wherein:

each said section has as a section pole pitch (PPs), the section pole pitch being the same within each section;

wound teeth of adjacent sections are spaced by a boundary pole pitch (PPb); and the end space has a size equal to the boundary pole pitch minus the section pole pitch (PPb−PPs).

10. An electromechanical machine according to claim 9, wherein the boundary pole pitch is defined by the function:

$$PPb = \left(\frac{360 - (P \times PPs)}{N}\right) + PPs$$

where:
PPb is the boundary pole pitch;
PPs is the section pole pitch;
P is the number of poles; and
N is the number sections.

11. An electromechanical machine according to claim 10, wherein the section pole pitch is defined by the function:

$$PPs = \frac{360}{P} \times \left(1 - \frac{N \times Ph \times X}{H \times P}\right)$$

where:
PPs is the section pole pitch;
P is the number of poles;
Ph is the number of phases;

H is the harmonic number corresponding to a torque ripple harmonic to be reduced or eliminated in the operation of the machine;
N is the number of sections; and
X is a factor in the range of greater than zero to one corresponding to a selected amount of torque ripple reduction.

12. A stator for an electromechanical machine, comprising wound stator poles formed on teeth having a depth, wherein:

the wound poles are arranged a plurality of sections each comprising a set of wound poles with two wound end poles, one at each section end;

the wound end poles are spaced from the section ends by an end space at each section end, the end space having a width of approximately the distance from the end pole winding to the section end, and a depth of approximately the depth of the wound pole teeth to define an end space area; and at least one unwound tooth is disposed in the end spaces defined by adjacent section end, the unwound teeth occupying not more than 90% of the total end space area of the adjacent sections.

13. An electromechanical machine according to claim 12, wherein said at least one unwound tooth has a trapezoidal shape.

14. An electromechanical machine according to claim 12, wherein said at least one unwound tooth has a substantially rectangular shape and at least one of a depth less than the wound pole teeth depth and a width less than the total end space width.

15. An electromechanical machine according to claim 12, wherein the sections are formed as physically separate segments and said at least one unwound tooth comprises two adjacent unwound teeth.

16. A method for arranging wound stator poles in an electromechanical machine to reduce torque ripple, the wound poles being formed on teeth having a depth, the method comprising:

conceptually dividing the stator poles into a plurality of sections to provide a sectionalized stator with each section having ends adjacent a next section;

arranging the poles of the sectionalized stator in a plurality of sets of poles, each set disposed within one said section and having two end poles, one at each section end; and positioning the poles within each set at a section pole pitch, the section pole pitch being a function of the frequency of the torque ripple harmonic to be at least reduced in operation of the machine;

positioning the end poles of adjacent sections at a boundary pole pitch, the boundary pole pitch being a function of the section pole pitch;

spacing the end poles from the section ends by an end space at each section end, the end space having a width of approximately the distance from the end pole winding to the section end, and a depth of approximately the depth of the wound pole teeth to define an end space area; and disposing an unwound tooth in each said end space, the unwound teeth occupying not more than 90% of said end space area.

17. The method according to claim 16, wherein the section end is disposed at a distance from the end pole center of approximately half the boundary pole pitch.

18. The method according to claim 16, wherein a single unwound tooth is positioned within the end spaces of adjacent sections.

19. The method according to claim 16, further comprising providing the conceptual sections as physically separate segments wherein separate unwound teeth are positioned within the end spaces of adjacent sections.

20. The method according to claim 16, further comprising sizing the unwound teeth to have a depth of approximately 90-98% of the wound pole teeth.

21. The method according to claim 16, wherein the unwound teeth have a trapezoidal shape.

22. The method according to claim 16, wherein the unwound teeth have a substantially rectangular shape and a depth less than the wound pole teeth depth.

23. The method according to claim 16, wherein the unwound teeth have a substantially rectangular shape and a width less than the end space width.

24. The method according to claim 16, wherein said section pole pitch function is:

$$PPs = \frac{360}{P} \times \left(1 - \frac{N \times Ph \times X}{H \times P}\right)$$

where:
- PPs is the section pole pitch;
- P is the number of poles;
- Ph is the number of phases;
- H is the harmonic number corresponding to a torque ripple harmonic to be reduced or eliminated in the operation of the machine;
- N is the number of sections; and
- X is a factor in the range of greater than zero to one corresponding to a selected amount of torque ripple reduction.

25. The method according to claim 24, wherein said pole pitch function is:

$$PPb = \left(\frac{360 - (P \times PPs)}{N}\right) + PPs$$

where:
- PPb is the boundary pole pitch;
- PPs is the section pole pitch;
- P is the number of poles; and
- N is the number of sections.

* * * * *